June 24, 1930.  G. B. COLEMAN  1,767,916

TRANSMISSION

Filed June 23, 1926  2 Sheets-Sheet 1

INVENTOR.
George B. Coleman
BY
ATTORNEY.

June 24, 1930.	G. B. COLEMAN	1,767,916
TRANSMISSION
Filed June 23, 1926	2 Sheets-Sheet 2
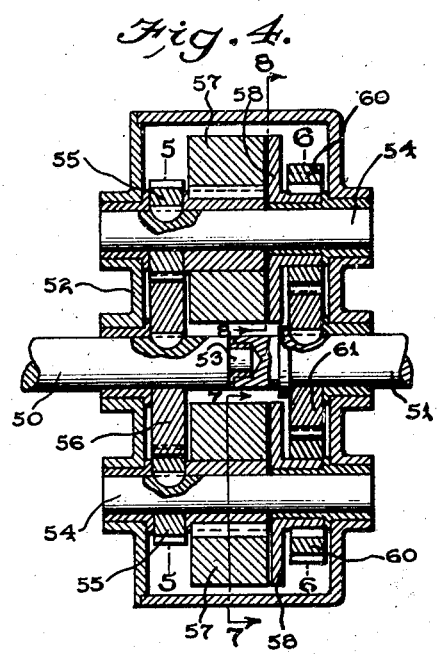
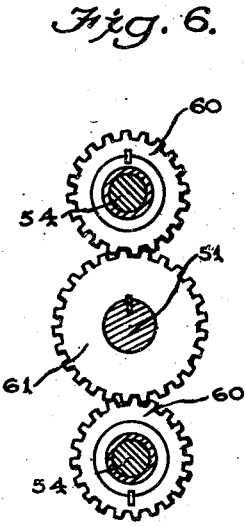
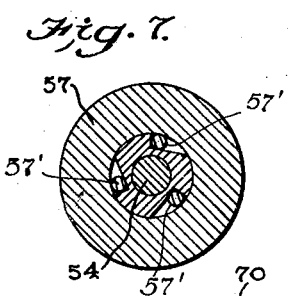
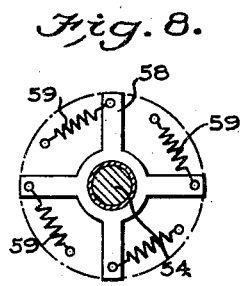
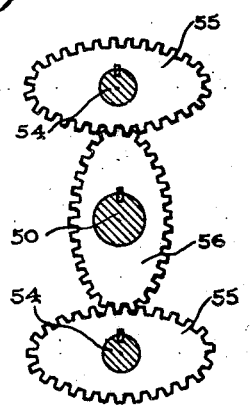
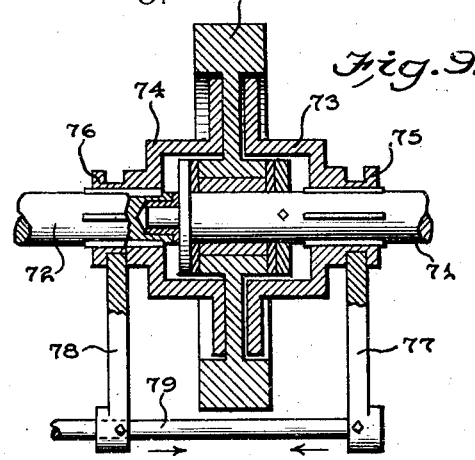
INVENTOR.
George B. Coleman
BY
ATTORNEY.

Patented June 24, 1930

1,767,916

UNITED STATES PATENT OFFICE

GEORGE B. COLEMAN, OF PHILADELPHIA, PENNSYLVANIA, ASSIGNOR TO COLEMAN AUTOMATIC TRANSMISSION COMPANY, A CORPORATION OF CALIFORNIA

TRANSMISSION

Application filed June 23, 1926. Serial No. 118,025.

The object of the invention is to provide a transmission in which the torque-speed factor will vary in a straight line in the acceleration of the load from rest up to the speed of the prime mover; to provide a construction of this character in which the energy of the prime mover is first transferred to a moving mass and thereafter transferred by such mass to the load; to provide a construction in which the inert masses will consist of fly wheels alternately and automatically connected with the prime mover and the load, the energy of the prime mover being stored in the one while it is being delivered to the other and vice versa; and to provide a construction of this character in which the rate of change of connection of the masses with the prime mover and load may be governed by the operator.

Figure 1:
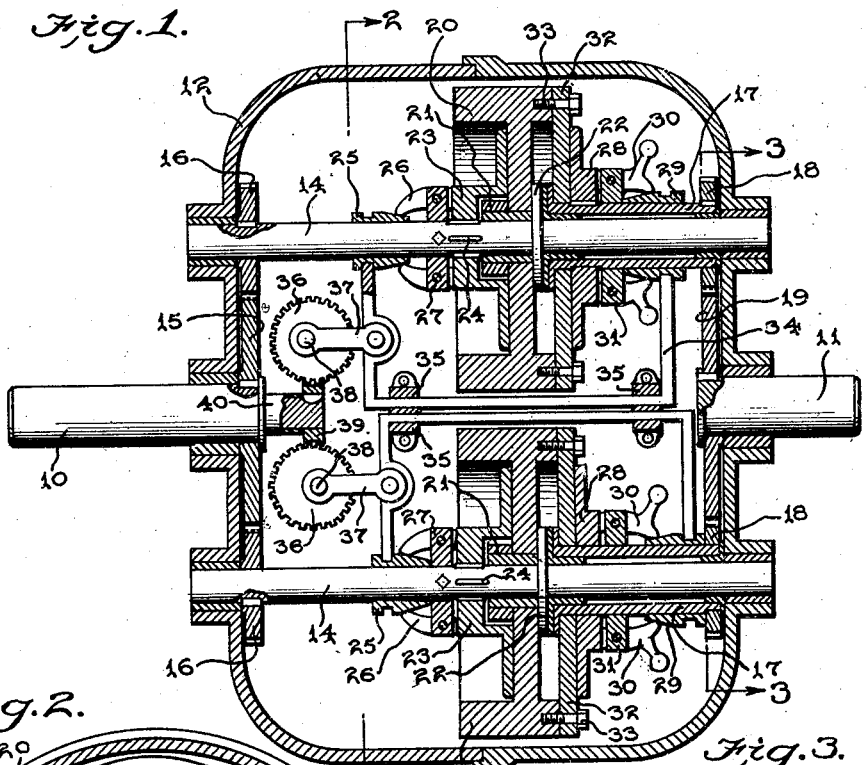

With this object in view, the invention consists in a construction and combination of parts of which a preferred embodiment is illustrated in the accompanying drawings, wherein:

Figure 1 is a horizontal sectional view through a transmission embodying the invention.

Figure 2:
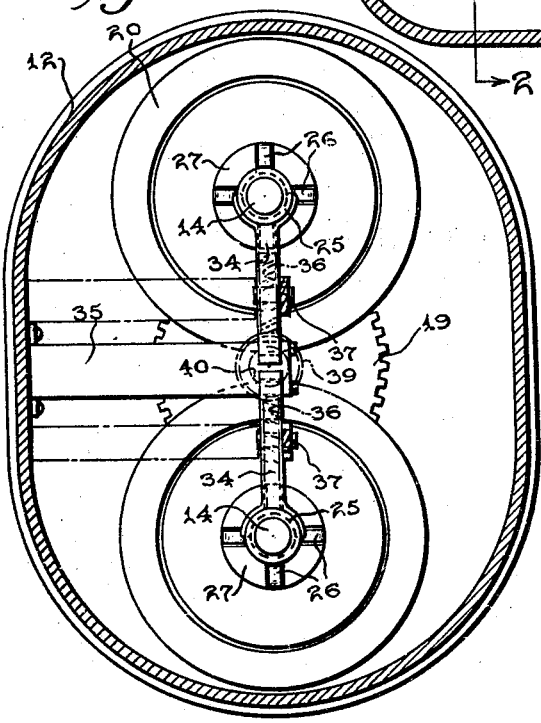
Figure 3:
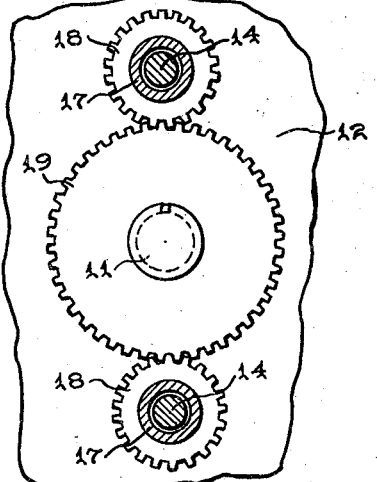

Figures 2 and 3 are respectively sectional views on the planes indicated by the lines 2—2 and 3—3 of Figure 1.

Figure 4 is a horizontal longitudinal sectional view showing a modification of the invention.

Figures 5, 6, 7 and 8 are respectively sectional views on the planes indicated by the lines 5—5, 6—6, 7—7 and 8—8 of Figure 4.

Figure 9 is a horizontal longitudinal sectional view of still another modification.

The driver and driven are represented respectively as the stub shafts 10 and 11 which are designed, when the invention be used in connection with motor vehicles, for connection respectively to the engine and propeller shaft. The driver 10 is journaled in the forward end of the casing 12 and the driven in the rear end of the casing, the two being in axial alignment and the former being operatively connected with diametrically disposed parallel countershafts 14 by means of a gear 15 meshing with pinions 16 carried by the countershafts. The countershafts are journaled in the forward and rear walls of the casing 12 and loosely surrounding these countershafts are hollow shafts 17 which are provided with pinions 18 meshing with a gear 19 carried by the driven.

Fly wheels 20 are floatingly supported on the countershafts 14 and are designed for operative connection first with the countershafts and then with the hollow shafts 17, so that they may first be accelerated by means of the driver 10 by which the countershafts are rotated and thereafter transfer the energy thus stored to the driven 11. Movement axially of the countershafts 14 is precluded by means of collars 21 and 22 secured to the countershafts and the operative connection of the fly wheels with the countershafts is effected by means of clutch members 23 movable axially of the countershafts but precluded from turning movement thereon by means of keys 24.

Thimbles 25 axially movable of the countershafts effect engagement and disengagement of the clutch members with the fly wheels through the instrumentality of fingers 26 rockably mounted in yokes 27 carried by the countershafts. Similarly, clutch members 28 are supported upon the hollow shafts 17 and engaged with or disengaged from the fly wheels by means of thimbles 29 operating in connection with fingers 30 carried by yokes 31 supported by the hollow shafts. The portions of the fly wheels 20 engaged by the clutch members 28 are in the form of disks 32 secured to the fly wheels in the assembly of the apparatus by means of cap screws 33.

The thimbles 25 and 29 are actuated, the one for releasing operation of its respective clutch member when the other effects clutching action thereof, and to this end they are operatively connected by means of double-ended shifter forks 34 slidably mounted in bearings 35 carried by the casing. The forks are reciprocated by means of spiral gears 36 which are operatively connected with the forks by means of links 37, the connections of the latter with the spiral gears being by means of eccentrically disposed wrist pins 38. The spiral gears 36 are in mesh with and driven by a common spiral gear 39 supported on the stub extension 40 of the driver 10.

The spiral gears 36 are so disposed that in their rotation, the wrist pin of the one has a lead of one hundred and eighty degrees over the other. Thus, when one of the shifter forks is advanced to its extreme position forwardly, the other is moved to its extreme position rearwardly. Therefore, the one is effecting the actuation of the clutch member 23 on one of the countershafts 14 and the other the actuation of the clutch 28 on the hollow shaft 17 surrounding the other countershaft. By this means, the driver is accelerating first one of the fly wheels and then the other, the period of accelerating the one being attended with the transfer by the other of the energy previously stored by the driver, this transfer being effected by the actuation of one of the clutch members 28 so that the fly wheel may drive its hollow shaft 17 and thus transfer its energy to the driven shaft 11 through the gears 18 and 34.

In the modification shown in Figures 5 to 8, inclusive, the driver and driven 50 and 51 are axially aligned, being respectively journaled in the forward and rear ends of the casing 52 and being connected centrally of the casing by means of a stub projection 53 on the one engaging a socket on the other. Paralleling the driver and driven and disposed on diametrically opposite sides of the same are the countershafts 54 which are journaled in the opposite ends of the casing. These countershafts are operatively connected with the driver by means of elliptical gears 55 carried by them and meshing with an elliptic gear 56 carried by the driver. Each countershaft 54 carries its own fly wheel 57 which is provided with a ball clutch 57' mounted so that in the turning movement of the shafts 54, the fly wheel may not fall below the angular speed of the shafts but may acquire a greater angular speed than the latter.

Since there are operative connections between the driver and the countershafts by means of the elliptic gearing, an intermittent rotary movement is imparted to the countershafts and at the instant of their greater angular movement, the clutches become effective for imparting movement to the fly wheels which may continue after the angular speed of the countershafts drops off. The fly wheels thus rotate free of the countershafts until their speeds at any instant drops off to the speeds of the countershafts at that instant. Loosely mounted on the countershafts 54 are spiders 58 and connection between the spiders and the fly wheels is in the form of springs 59 connected between points on the side faces of the fly wheels and points at the extremities of the arms of the spiders. The spiders are operatively connected with the driven 51 by means of pinions 60 carried by them which mesh with a spur gear 61 carried by the driven.

In the modified construction just described, the constant speed of the driver results, through the elliptic gearing, in an intermittent speed of the countershafts and thus the acceleration of the fly wheels 57 is effected, the energy thus stored being transferred to the driven from the fly wheels through the medium of the yielding connections of the latter with the spiders which are positively connected with the driven, as before described.

In the modification shown in Figure 9, a single fly wheel is employed in lieu of the two shown in the form illustrated in Figure 1. This fly wheel 70 is floatingly mounted on the driven 71 which is axially aligned with the driver 72 and is alternately engaged by the clutch members 73 and 74 mounted on opposite sides thereof, the former being keyed to the driven for movement axially thereof and the latter being similarly connected to the driver. Thimbles 75 and 76 are formed as parts of the clutch members 73 and 74 and are engaged by shifter forks 77 and 78 connected by a common shifter rod 79. The clutch members are keyed to their respective shafts so that there may be no relative angular or turning movement, and movement of the shifter rod 79 in one direction effects clutching operation of the one clutch member and the release of the other and the movement of the shifter rod in the other direction effecting the reverse of these operations. Thus, the driver 72, when connected to a prime mover, will function to drive the fly wheel during the period when the clutch member 74 is in clutching position, idling when the clutch member 74 is released, at which time the clutch 73 functioning, the energy previously stored in the fly wheel 70 will be transferred to the driven 71.

The invention having been described, what is claimed as new and useful is:

1. A transmission comprising driving and driven members, a plurality of freely rotating mass members, and means for effecting operative connections between the mass members and the driving member and the mass members and the driven member, said means being actuable to effect connection between one of the mass members and the driving member simultaneously with the connection of another mass member with the driven member.

2. A transmission comprising driving and driven members, a plurality of freely rotating mass members, and means for effecting operative connections between the mass members and the driving member and the mass members and the driven member, said means being actuable to effect connection between one of the mass members and the driving member simultaneously with the connection of another mass member with the driven member and vice versa.

3. A transmission comprising driving and driven members, a plurality of freely rotating mass members, and means for effecting operative connections between the mass members and the driving member and the mass members and the driven member, said means being actuable in timed relation with one of the members and functioning to connect one mass member with the driven member simultaneously with the connection of another mass member with the driving member and vice versa.

In testimony whereof he affixes his signature.

GEORGE B. COLEMAN.